US012664654B2

(12) United States Patent
Przeździecka-Dołyk et al.

(10) Patent No.: US 12,664,654 B2
(45) Date of Patent: Jun. 23, 2026

(54) COMPUTER-IMPLEMENTED METHOD AND SYSTEM FOR DETERMINING OPTICAL PROPERTIES OF EYE

(71) Applicant: Gepetto Sp. z o.o., Wrocław (PL)

(72) Inventors: Joanna Przeździecka-Dołyk, Wrocław (PL); Kamil Kalinowski, Wrocław (PL); Wojciech Drzewiński, Wrocław (PL); Mateusz Toporowicz, Wrocław (PL); Piotr Kruszyński, Zgierz (PL)

(73) Assignee: Feyenally SP Z O.o, Wrocław (PL)

( * ) Notice: Subject to any disclaimer, the term of this patent is extended or adjusted under 35 U.S.C. 154(b) by 359 days.

(21) Appl. No.: 18/325,265

(22) Filed: May 30, 2023

(65) Prior Publication Data

US 2024/0404059 A1    Dec. 5, 2024

(51) Int. Cl.
*G06K 9/00*    (2022.01)
*G06T 7/00*    (2017.01)

(52) U.S. Cl.
CPC .. *G06T 7/0014* (2013.01); *G06T 2207/10024* (2013.01); *G06T 2207/20081* (2013.01); *G06T 2207/20084* (2013.01); *G06T 2207/30041* (2013.01)

(58) Field of Classification Search
CPC ......... G06T 7/0014; G06T 2207/10024; G06T 2207/20081; G06T 2207/20084; G06T 2207/30041
See application file for complete search history.

(56) References Cited

U.S. PATENT DOCUMENTS

| | | | | |
|---|---|---|---|---|
| 2011/0122279 A1* | 5/2011 | Kim | ..................... | G06V 40/193 348/222.1 |
| 2018/0089834 A1* | 3/2018 | Spizhevoy | ........... | G06V 40/193 |
| 2023/0214993 A1* | 7/2023 | Katz | ..................... | G06T 7/0012 |

FOREIGN PATENT DOCUMENTS

| | | | | |
|---|---|---|---|---|
| WO | WO-2014051010 A1 * | 4/2014 | ............. | A61B 3/113 |
| WO | WO-2016126556 A1 * | 8/2016 | ............... | A61B 3/13 |

* cited by examiner

*Primary Examiner* — Xin Jia
(74) *Attorney, Agent, or Firm* — Pillsbury Winthrop Shaw Pittman LLP

(57) ABSTRACT

Disclosed is a computer-implemented method for determining optical properties of an eye. The computer-implemented method comprises collecting one or more than one images of the eye. Moreover, the computer-implemented method comprises analyzing the collected one or more than one images using a trained neural network and determining the optical properties of the eye based on the analysis of the one or more than one images. The method provides accessible, cost-efficient, user-friendly, efficient and personalized diagnostics to the users by using the trained neural network.

14 Claims, 2 Drawing Sheets

100

COLLECT ONE OR MORE IMAGES OF EYE
102

ANALYZE COLLECTED ONE OR MORE IMAGES USING TRAINED NEURAL NETWORK
104

DETERMINE OPTICAL PROPERTIES OF EYE BASED ON ANALYSIS OF ONE OR MORE IMAGES
106

100

COMPUTER-IMPLEMENTED METHOD AND SYSTEM FOR DETERMINING OPTICAL PROPERTIES OF EYE

TECHNICAL FIELD

The present disclosure relates generally to the field of ophthalmic digital health techniques and, more specifically, to a computer-implemented method for determining optical properties of an eye and a system for determining optical properties of an eye.

BACKGROUND

The field of digital ophthalmic diagnostics is constantly evolving to better treat, manage and monitor progression of ophthalmic diseases. Notably, the digital ophthalmic diagnostics employ various software applications and tools to help users maintain healthy eyesight and treat eye-related problems thereof. Moreover, the digital ophthalmic diagnostics support integration of digital technologies into healthcare systems and processes to support user's care, enhance clinical decision-making, and improve healthcare delivery.

Currently, such software applications use external attachment features such as physical or hardware measurement tools. In this regard, the users are required to purchase and set up additional hardware measurement tools, thus making the examination process expensive. Moreover, data collected from such physical or hardware measurement tools is inaccurate sometimes. Furthermore, the use of such physical or hardware measurement tools limits access to such software applications for users who live in remote or underserved areas.

Conventionally available software applications are not designed to diagnose complex eye problems that require specialist knowledge. Instead, such software applications focus on simple visual impairments such as near-sightedness or farsightedness, and their accuracy is often questionable. Furthermore, such software applications require users to have access to specialized equipment such as eye charts, which can be difficult to obtain, especially for those living in the remote areas. As a result, users with complex eye defects who require specialist help may not receive the necessary care, leading to further complications and worsening of the eye condition thereof. Furthermore, current software applications fail to meet industry standards for data security and thus fail to ensure data privacy.

Therefore, in light of the foregoing discussion, there exists a need to overcome the aforementioned drawbacks associated with existing processes for digital ophthalmic diagnostics.

SUMMARY

The present disclosure provides a computer-implemented method for determining optical properties of an eye. The present disclosure provides a system for determining optical properties of an eye. The present disclosure provides a solution to the existing problems associated with digital ophthalmic diagnostics by providing a revolutionary, accessible, cost-efficient, customized, user-friendly, interoperable, impersonal, efficient and robust method. An objective of the present disclosure is to provide a solution that overcomes at least partially the problems encountered in the prior art and provide an improved method and an improved system for determining optical properties of an eye.

In one aspect, the present disclosure provides a computer-implemented method for determining optical properties of an eye, the computer-implemented method comprising:

collecting one or more than one images of the eye;

analyzing the collected one or more than one images using a trained neural network; and determining the optical properties of the eye based on the analysis of the one or more than one images.

In Some Embodiments the Computer-Implemented Method is a Digital Ophthalmic Diagnostics Method Optionally, the one or more than one images are collected from a user device, a server.

Optionally, the method further comprises labelling and storing, in the server, the collected one or more than one images, wherein the collected one or more than one images are stored in a folder associated with a user, wherein the folder has a first subfolder specific for one or more than one images of a left eye of the user, a second subfolder specific for one or more than one images of a right eye of the user, and a database of the user.

Optionally, the method further comprises pre-processing the collected one or more than one images for at least one of: a noise removal, a distortion correction, a red-eye effect detection, resolution correction.

Optionally, the method further comprises activating an image capturing unit of the user device, arranged relative to the eye, to obtain one or more than one images when a red-eye effect is detected by the image capturing unit.

Optionally, analyzing the collected one or more than one images comprises one or more than one of: detecting patterns on the one or more than one images, determining a distance between the image capturing unit and the eye, shifts and tilts between the image capturing unit and eye axes.

Optionally, the distance between the image capturing unit and the eye is measured using a measurement tool.

Optionally, the trained neural network is a convolutional neural network.

Optionally, the method further comprises employing artificial intelligence algorithms and machine learning tools for detecting one or more than one characteristic features of the one or more than one images, wherein the machine learning tools are employed for sorting, systematizing, analyzing the one or more than one images and output a diagnosis based thereon, and the artificial algorithms employ the machine learning output and data derived from observation by a specialist to confirm the diagnosis.

Optionally, the method further comprises screening users based on a pre-defined threshold.

Optionally, the method further comprises providing a report of the analysis of the one or more than one images, wherein the report comprises one or more than one of: a defect, a probability of a measurement error, an advice regarding a physical consultation with a specialist.

In another aspect, the present disclosure provides a system for determining optical properties of an eye, the system comprising a processor configured to:

collect one or more than one images of the eye;

analyze the collected one or more than one images using a trained neural network; and determine the optical properties of the eye based on the analysis of the one or more than one images.

In Some Embodiments the System is a Digital Ophthalmic Diagnostics System

In yet another aspect, the present disclosure provides a computer program product comprising a non-transitory computer-readable storage medium having computer-readable instructions stored thereon, the computer-readable instructions being executable by a computing device comprising a processor to execute the aforementioned method as claimed in any of the aforementioned claims.

Embodiments of the present disclosure substantially eliminate or at least partially address the aforementioned problems in the prior art, and enable the determination of the optical properties of the eye. Moreover, the aforementioned computer-implemented method uses the trained neural network for analyzing the one or more than one images of the eye, thereby supporting the method to become fully objective. Furthermore, the method provides improved prediction accuracy with the number of users tested. Beneficially, the trained neural networks are resistant to disturbances occurring in the one or more than one images, thereby providing high precision. It will be appreciated that the method remains accurate, consistent, and fair irrespective of the user using it.

Additional aspects, advantages, features and objects of the aspects of the disclosed embodiments would be made apparent from the drawings and the detailed description of the illustrative embodiments construed in conjunction with the appended claims that follow.

It will be appreciated that features of the aspects of the disclosed embodiments are susceptible to being combined in various combinations without departing from the scope of the aspects of the disclosed embodiments as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the aspects of the disclosed embodiments, exemplary constructions of the disclosure are shown in the drawings. However, the aspects of the disclosed embodiments are not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practicing the aspects of the disclosed embodiments are also possible.

Figure 1:
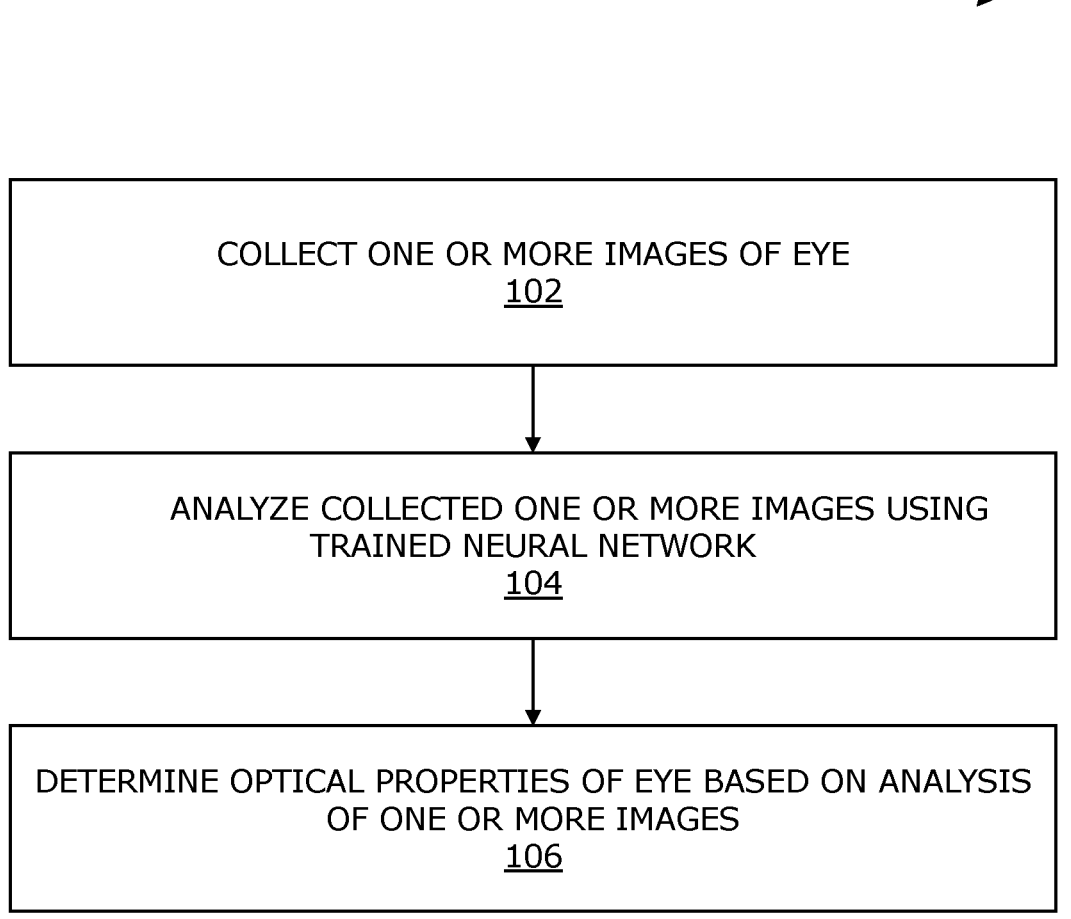
FIG. 1 is a flowchart depicting steps of a computer-implemented method for determining optical properties of an eye, in accordance with an embodiment of the present disclosure.

Referring to FIG. 1, there is shown a flowchart depicting steps of a computer-implemented method 100 for determining optical properties of an eye, in accordance with an embodiment of the present disclosure. The method 100 includes steps 102 to 106.

There is provided the method 100 for determining the optical properties of the eye. In this regard, the optical properties refer to various characteristics of the eye that relate to its ability to perceive light and form visual images. Moreover, the optical properties include the eye's ability to refract light, adjust focus, and transmit light to the retina. It will be appreciated that the eye is measured for the optical property, such as a refractive error thereof in order to diagnose and treat vision disorders. Notably, the refractive error of the eye is a measurement that indicates how well the eye could focus light onto a retina at the back of the eye. Moreover, the refractive error has three main components such as a spherical defect (DS), a cylindrical defect (DC), and an angle of astigmatism (DEG). Typically, the spherical defect and the cylindrical defect are expressed in units of diopters (D). Typically, the angle of astigmatism is measured in degrees (or angles). Furthermore, the optical properties of the eye include a size and shape of the pupil, a curvature of a cornea, a color of an iris, a sensitivity of the eye to contrast and color, retinal abnormalities, and so forth.

Notably, the spherical defect refers to a degree of near-sightedness or farsightedness of the eye. Typically, a negative DS value indicates near-sightedness, where the eye focuses light in front of the retina. Moreover, a positive DS value indicates farsightedness, where the eye focuses light behind the retina. Furthermore, a DS value of 0 indicates normal vision.

Notably, the cylindrical defect refers to a degree of astigmatism of the eye. Typically, the astigmatism occurs when a cornea of the eye is not perfectly round, causing light to be focused unevenly on the retina. Moreover, the DC value indicates the amount of astigmatism present in the eye. For example, a higher DC value indicates more astigmatism.

Notably, the angle of astigmatism refers to the orientation of the astigmatism in the eye, measured in degrees from 1 to 180. Typically, the axis value indicates the direction of the steepest meridian (a part of the cornea with a greatest curvature) in the eye. It will be appreciated that determination of the refractive error of the eye is used to prescribe corrective lenses (such as glasses or contact lenses) to improve vision of the eye.

At step 102, the method 100 comprises collecting one or more than one images of the eye. The term "images" as used herein refers to visual representations of the eye. Herein, the one or more than one images of the eye may be selected from one or more than one of: a whole eye, a part of eye, a left eye, a right eye, and so forth. It will be appreciated that the step of collection of the one or more than one images of the eye provides an actual image of the eye of the user, thereby allowing accurate diagnosis of the eye. Optionally, in operation, the method 100 enables the collection of the one or more than one images of the eye in an automatic manner. Optionally, the one or more than one images are collected from a user device, a server. The term "user device" refers to a device associated with a user. In this regard, the user device may be used for collecting the one or more than one images of the eye that is stored therein or capturing the one or more than one images of the eye using an image capturing unit. Examples of user devices include, but are not limited to, smartphones, laptops, tablet computers, and the like. Optionally, the one or more than one images are transmitted to the server. Herein, the method 100 employs the server for the collection of the one or more than one images therefrom. Moreover, the user device is communicably coupled to the server and a processor (described later in FIG. 2). Optionally, the step of collection of the one or more than one images using the server includes the step of authentication, navigation, download, and so forth. For example, the user is required to first authenticate themselves with the server in order to access the one or more than one images of the eye. Optionally, the authentication includes entering a username and a password, or using other forms of authentication such as biometric identification or single sign-on. Once authenticated, the user is required to navigate to the location of the one or more than one images that is required to be downloaded on the server. This includes browsing through directories or using a search function to locate specific files. Now, once the user has located the required one or more than one images, the download process is initiated. Optionally, this involves selecting the required one or more than one images and clicking on a download button or link. The server will then transfer the required one or more than one images to the user device over a communication network such as the internet. Optionally, the server is a secured cloud environment such as an iCloud. It will be appreciated that the method 100 ensures a seamless user experience by providing reliable and efficient transmission of the one or more than one images of the eye and without any data loss. It will be appreciated that the method 100 supports an automatic archiving of data for processing thereof. Optionally, the automatic data archiving is a function that causes automatic transfer of data to the server outside the user device, thereby allowing for secure data storage. Optionally, said infrastructure enables safe and scalable data processing and backup.

Optionally, the method 100 further comprises activating an image capturing unit of the user device, arranged relative to the eye, to obtain the one or more than one images when a red-eye effect is detected by the image capturing unit. The term "image capturing unit" as used herein refers to one or more than one cameras of the user device. Moreover, the image capturing unit comprises one or more than one image sensors that may be used to capture the one or more than one images of the eye. Optionally, the image capturing unit may capture a video of the eye. In such a case, the one or more than one images may be frames of the video captured by the image capturing unit. In an implementation, the method 100 enables a detection of a position of the image capturing arrangement in order to arrange thereto at a suitable position relative to the eye. In such a case, the image capturing unit captures the one or more than one images accurately. The term "red-eye effect" as used herein refers to a phenomenon that occurs in photography, where pupils of the eyes appear red in the one or more than one images, usually when the one or more than one images is taken with a flash in low light conditions. Typically, the flash illuminates a retina of the eye, and blood vessels in the retina reflect the light back out through the pupil and into lens of the image capturing unit, causing the red-eye effect. The red color in the one or more than one images is caused by the reflection of the light off the blood vessels in the retina, which are rich in blood and appear red. Optionally, the red-eye effect is more noticeable in the users with lighter eye colors, such as blue or green, and is less noticeable in the users with darker eye colors, such as brown.

Optionally, the method 100 uses a guidance algorithm for selecting the image capturing unit that is optimally positioned relative to a light source. Herein, the guidance algorithm refers to a class of algorithms used to control a movement of the image capturing unit in order to capture the one or more than one images having a high-quality. Typically, the goal of the guidance algorithm is to ensure that the image capturing unit is positioned and oriented in a way that maximizes the quality and usefulness of the one or more than one images captured therefrom. Optionally, the guidance algorithm could be implemented as a software component that runs on the user device. For example, the guidance algorithm such as an object tracking algorithm might be used to keep the eye in the center of the image capturing unit's view.

Optionally, in order to generate the red-eye effect, the light source is positioned at the center of the image capturing unit as close as possible. Additionally, the method 100 enables blocking the automatic switching of the image capturing unit when the relative distance between the image capturing unit and the eye is not appropriate. Optionally, the method 100 enables the image capturing unit to control a zooming feature thereof.

It will be appreciated that the step of activation of the image capturing unit upon detecting the red-eye effect allows the user to self-examine the eye. For example, when the user device is at the correct angle relative to the light source, the image capturing unit, and the eye being examined, the guidance algorithm triggering the at least one image acquisition is activated. Optionally, the activation of the image capturing unit is also essential for automating the process and avoiding disturbances caused by the user's hand tremors. For example, the user's hand may tremor when they see that the red-eye effect has been achieved and they are required to press a trigger button of the image capturing unit. Additionally, the activation allows an examination of bed-ridden persons or individuals with paralysis. Optionally, the method 100 enables preparing a set of protocols for guiding the users on how to move the user device around a face thereof to maximize the possibility of achieving the desired effect and minimize the time required to achieve it.

Optionally, the method 100 supports controlling the light source that allows maximizing a possibility of achieving the red eye effect in various conditions. Notably, the human eye has adaptive abilities to external lighting conditions, i.e., the pupil starts to narrow in bright light, which is an unfavorable effect when acquiring a reflection. Optionally, the flashlight's power could be adjusted to achieve the red eye effect without causing the pupil constriction that would prevent the user from obtaining the one or more than one images accurately. Optionally, during the measurement for the purpose of detecting the red eye effect, the eye shines steadily. Moreover, at the time of taking the one or more than one images, the power of the flashlight increases for a time when the pupil's reaction will not occur because it will not be noticeable to the user, thereby allowing for an accurate one or more than one images. Furthermore, once the desired effect is detected, the image capturing arrangement is activated and the one or more than one images is captured.

Optionally, the method 100 further comprises pre-processing the collected one or more than one images for at least one of: a noise removal, a distortion correction, a red-eye effect detection, resolution correction. In this regard, the method 100 enables the pre-processing of the collected one or more than one images in order to prepare thereto for analysis using a neural network. The term "noise removal" as used herein refers to a process of reducing or eliminating unwanted variations or irregularities in the one or more than one images, such as random variations in brightness and color that result from electronic interference or other sources. Optionally, the step of pre-processing includes employing noise removal techniques that use filters or other image processing algorithms to selectively smooth or sharpen the one or more than one images of the eye, depending on the nature and severity of the noise. For example, during the pre-processing, the red pupils are extracted from the one or more than one images of the eye based on a color filter. In such a case, the one or more than one images is first converted to a color model (such as a CIELAB color space), that allows separation of the one or more than one images into three components: L (lightness), a (red-green), and b (blue-yellow). Moreover, such conversion allows for separation of intensity and color information, making it easier to identify the red pupils. Then, logical masks are created where the pupil is located by combining a mask indicating the color within the characteristic spectrum of the red-eye effect and areas with high brightness (a pinpoint reflection on the pupil). Optionally, an algorithm that applies the Hough transform is used to detect the circle from the logical mask.

The term "distortion correction" as used herein refers to a process of correcting or eliminating the distortion in the one or more than one images caused by various factors such as lens distortion, camera angle, and perspective. Notably, the distortion in the one or more than one images could cause the eye in the one or more than one images to appear stretched, compressed, or warped, and could result in a loss of image quality or accuracy. In this regard, the step of pre-processing enables the correction of the distortion using various distortion correction algorithms. Optionally, the distortion correction algorithms use geometric transformations that adjust pixel coordinates of the one or more than one images to compensate for the distortion. For example, a barrel distortion caused by a wide-angle lens may be corrected using a radial distortion correction algorithm that applies a radial transformation to the pixels of the one or more than one images. Optionally, a perspective distortion caused by the angle of the image capturing unit may be corrected using a projective transformation that adjusts the perspective of the one or more than one images.

Optionally, the step of pre-processing allows the red-eye effect detection in the one or more than one images collected from the user device or the server. For example, during the red-eye effect detection a circle is detected from the logical mask and the red pupil is extracted from the one or more than one images. Optionally, in order to cause the red eye effect, an exposure level of the light source (such as a flashlight) in the user device is controlled. In an example, the method 100 employs the guidance algorithm to detect the visible red eye effect and lights up and automatically takes a series of the one or more than one images. The term "resolution correction" as used herein refers to a process of adjusting the resolution of the least one image or video to correct for any distortion or pixelation that may have occurred during the capture or processing of the one or more than one images.

Optionally, the step of pre-processing is performed using an open source library such as a MediaPipe for building a real-time, cross-platform computer vision and machine learning pipelines. It will be appreciated that such pre-processing tools could be used for a variety of applications, such as object detection, hand tracking, and facial recognition. For example, the open source library is used to remove the area around the eye. Optionally, such open source libraries include artificial intelligence-based face detection functions that allow for accurate detection of the position and boundaries of the eye. In an implementation, the step of processing may include the detection of half of the face, including the nose of the user. Optionally, if the pre-processing tools detect two eyes in the one or more than one images, it selects the eye that is closer to the center of the one or more than one images. Optionally, such a case is always true for a properly captured the one or more than one images. This is because the user is looking into the distance to the left or right (depending on the eye being examined) relative to the image capturing unit of the user device. Optionally, the extracted pupil has a square shape with an unknown resolution. Optionally, in order to make the one or more than one images compatible with a neural network, it is scaled to a resolution of 300×300 pixels. Optionally, the area outside the pupil has no impact on the neural network's results, so it is blacked out.

At step 104, the method 100 comprises analyzing the collected one or more than one images using a trained neural network. The term "neural network" as used herein refers to a network of artificial neurons programmed in software such that it tries to simulate human brain, for example to perceive images, video, sound, text, and so forth. The neural network typically comprises a plurality of node layers, containing an input layer, one or more than one intermediate hidden layers, and an output layer, interconnected, such as in a feed-forward manner (i.e. flow in one direction only, from input to output). The neural network takes as input the collected one or more than one images and output, via several nodes connected to one another, an individual output. Moreover, the neural networks are trained using at least one of: an image data, or a training dataset, to learn and improve their accuracy over time. Notably, the training dataset comprises stored images on the server. Optionally, training the neural networks could be performed through forward propagation (i.e. from input to output) as well as back propagation (i.e. from output to input).

The first step in analyzing the one or more than one images using the neural network is to pre-process the one or more than one images. In this regard, the one or more than one images is converted into a format that could be used by the neural network. Moreover, the conversion may include resizing the one or more than one images, converting the one or more than one images to grayscale or red green and blue (RGB), and normalizing pixel values of the one or more than one images. Furthermore, the pre-processed one or more than one images is inputted into the neural network. Herein, each layer performs a specific function on the one or more than one images.

Optionally, the trained neural network is a convolutional neural network. The term "convolutional neural network" or "('NNs" as used herein refers to a specialized type of neural network model developed for working with multidimensional image data such as 1D, 2D, 3D, and so forth. The convolutional neural networks consist of an input layer, hidden layers and an output layer. The CNN is employed to perform a linear operation called convolution. Alternatively, the CNN is a series of nodes or neurons in each layer of the CNN, wherein each node is a set of inputs, weight values, and bias values. As an input enters a given node, it gets multiplied by a corresponding weight value and the resulting output is either observed, or passed to the next layer in the CNN. Typically, the weight value is a parameter within the neural network that transforms input data within hidden layers of the neural network. The CNN comprises a filter that is designed to detect a specific type of feature in the one or more than one images. Beneficially, the CNN shares the weight values at a given layer, thus reducing the number of trainable parameters compared to an equivalent neural network. Furthermore, the CNN is trained to extract features from the one or more than one images using a feature map. Beneficially, the convolutional neural networks are implemented to reduce the computational complexity of the method 100 as it automatically detects the important features such as edges, corners, and other shapes.

The step of analyzing the one or more than one images includes passing the one or more than one images through a series of pooling layers. In this regard, the pooling layers downsample the one or more than one images by taking the maximum or average value of a set of pixels in the one or more than one images. It will be appreciated that such pooling layers enable extraction of the most important features from the one or more than one images. Furthermore, the step of analyzing the one or more than one images includes using a plurality of connected layers. In this regard, the plurality of connected layers take an output from the convolutional layers and the pooling layers and combine the output to make a prediction about the one or more than one images. The plurality of connected layers use a series of weights and biases to compute a probability distribution over the possible classes. Herein, the output of the neural network is a probability distribution over the possible classes. Furthermore, the class with a highest probability is chosen as the predicted class for the at least one input image.

Optionally, analyzing the collected one or more than one images comprises at least one of: detecting patterns on the one or more than one images, determining a distance between the image capturing device and the eye, shifts and tilts between the image capturing device and eye axes. In this regard, the trained neural networks analyze the one or more than one images by detecting patterns on the one or more than one images. For example, the patterns may include a presence of certain types of lesions or discolorations in the one or more than one images of the eye, which is indicative of a disease. It will be appreciated that the method 100 enables the detection of the pattern for determining a potential issue in the eye condition, and could flag the one or more than one images for further review by a medical professional. Then, the detected patterns are calculated along with additional parameters (that are not yet detected by the user device), such as the distance between the image capturing device and the eye. This information could be useful in ensuring that the one or more than one images are of sufficient quality to make an accurate diagnosis. For example, if the distance is too far, the one or more than one images may be blurry and difficult to analyze.

Optionally, the distance between the image capturing unit and the eye is measured using a measurement tool. In this regard, the measurement tool could be either hardware sensors or software solutions. Examples of the hardware sensors include a radar sensor, an ultrasonic sensor, a laser sensor, an infrared camera, and the like. Examples of the software solutions include artificial intelligence tools. It will be appreciated that the step of measuring the distance using the measurement tool ensures that the image capturing unit is at an appropriate distance from the eye. Optionally, the measurement tool is associated with the image capturing unit. In an implementation, the measurement tool is operable to measure the distance and provide the measured distance value to the user device. The image capturing unit of the user device receives the measured distance value and captures the one or more than one images of the eye accurately.

Optionally, the method 100 enables analyzing the one or more than one images to determine any shifts or tilts between the image capturing device and the eye axes. In this regard, such information could be useful in ensuring that the one or more than one images is properly aligned for the analysis. For example, if the one or more than one images is angled too high or too low, it may not capture the entire eye or it may capture too much of the surrounding area, which could affect the accuracy of the analysis. Optionally, in an example, the neural network was trained on data collected from 8 users with visual impairments (not exceeding 3 diopters). In such a case, the data includes information about 16 eyes in several variants, resulting from noise, distortions, and conditions of taking the one or more than one images. Beneficially, the training of the neural network based on different variants of the same eye increases the neural network's resistance to disturbances occurring in the one or more than one images. Moreover, in order to meet the high precision requirements for telemedical data processing instruments, the error range for the neural network is set at 0.75D.

Optionally, the method 100 further comprises labelling and storing, in the server, the collected one or more than one images, wherein the collected one or more than one images is stored in a folder associated with a user, wherein the folder has a first subfolder specific for one or more than one images of a left eye of the user, a second subfolder specific for one or more than one images of a right eye of the user, and a database of the user. In this regard, the method 100 supports labelling the collected one or more than one images of the eye according to data contained in a user's database and placed in the folder. In an example, the user's database is in the form of an excel file. Moreover, the label contains information about the eye's refractive error, user ID, and whether it is the left or the right eye. Optionally, the folder is updated every time the one or more than one images is stored therein. It will be appreciated that the step of labelling the one or more than one images allows smooth selection of the labelled one or more than one images from the user database. Optionally, the step of labelling is used for training the neural network or testing it on new data of the one or more than one images. Optionally, when none of the user's data has been downloaded yet, the method 100 enables creating the folder for them (and subfolders for the left and right eye) based on the user's database.

At step 106, the method 100 comprises determining the optical properties of the eye based on the analysis of the one or more than one images. In this regard, the step of determining the properties of the eye based on the analysis of the one or more than one images involves extracting meaningful information from the analyzed one or more than one images. Moreover, the extracted information is used to make inferences about the eye. Optionally, the step of determining the optical properties of the eye is performed using an algorithm such as a wave front analysis algorithm. Beneficially, the analyzed one or more than one images of the eye could be used to determine properties of the eye and diagnose eye conditions and recommend appropriate treatments. It will be appreciated that the method 100 provides a fully objective solution for determining the optical properties of the eye.

Optionally, the method 100 further comprises employing artificial intelligence algorithms and machine learning tools for detecting at least one characteristic feature of the one or more than one images, wherein the machine learning tools are employed for sorting, systematizing, analyzing one or more than one images and output a diagnosis based thereon, and the artificial algorithms employ the machine learning output and data derived from observation by a specialist to confirm the diagnosis. In this regard, the method 100 employs the artificial intelligence algorithms and machine learning tools to analyze the one or more than one images of the users, which will initially be annotated by industry specialists (such as optometrists, ophthalmologists, opticians, and the like). Moreover, the method 100 enables the automatic detection of characteristic features of the one or more than one images. ML tools will allow for sorting, systematizing, analyzing large sets of medical data, and demonstrating certain trends. AI algorithms, using synthetic data derived from both ML and specialists, will increase their prediction accuracy as patient datasets expand both numerically and in terms of individual flaws and case characteristics (samples). In this step, the neural networks compare the parameters of the one or more than one images with a database of simulated models and a database of real images obtained from the users such as volunteers. It will be appreciated that the aforementioned information is used for increasing the effectiveness of the method 100 by machine learning.

Optionally, the method 100 further comprises screening users based on a pre-defined threshold. In this regard, the method 100 allows screening of the users to determine whether a given user does not exceed the established norms for the method 100. Moreover, when a numerical value for the optical properties of the eye exceeds the pre-defined threshold then the method 100 generates a notification. In such a case, the notification could be a recommendation to the user to visit an eye specialist. It will be appreciated that the method 100 provides a safeguard measure to ensure that the user receives accurate and appropriate medical care.

Optionally, the method 100 further comprises providing a report of the analysis of the one or more than one images, wherein the report comprises one or more than one of: a defect, a probability of a measurement error, an advice regarding a physical consultation with a specialist. The term "report" as used herein refers to a document that presents information, analysis, or findings on a specific topic or issue. Optionally, a content of the report can range from simple facts and figures to complex analysis, and may include data, charts, graphs, and other visual aids to support the findings. It will be appreciated that the step of providing the report provides a clear and concise summary of information that can be used to make decisions or inform the users on a particular subject. Optionally, the report is a digital document having details regarding a medical history of the user (namely a patient). In this regard, the method 100 provides the report with information about the range of defects in the eye of the user. Optionally, the report may include the probability of measurement errors meaning that the user is presented with information about the errors that have occurred during the analysis of the one or more than one images. Optionally, the method 100 includes a built-in survey feature that allows screening of the users. In this regard, the users who have exceeded the established norms for the method 100 are screened out, for example in corner cases. Optionally, when the user exceeds the scale, they will be notified of the need to visit a specialist. Optionally, in the case of borderline values or when the user has indicated in the survey parameters that classify them into a corner case, the report includes the additional information recommending verification of the determined data regarding the optical properties of the eye by the specialist. Optionally, the report is displayed on the user device.

The aforementioned steps are only illustrative and other alternatives can also be provided where one or more than one steps are added, one or more than one steps are removed, or one or more than one steps are provided in a different sequence without departing from the scope of the claims herein.

Various embodiments and variants disclosed above, with respect to the aforementioned method 100, apply mutatis mutandis to the system 200.

Figure 2:
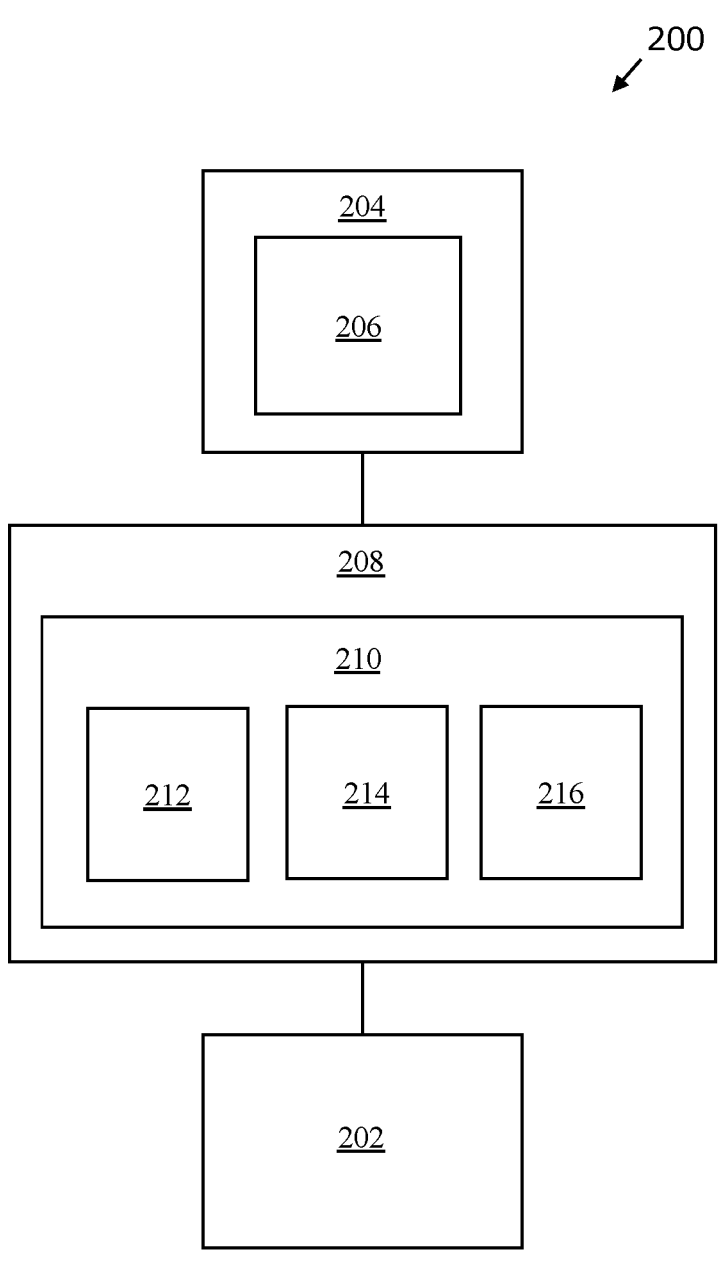
FIG. 2 is a block diagram illustrating a system for determining optical properties of an eye, in accordance with an embodiment of the present disclosure.

Referring to FIG. 2, there is shown a block diagram illustrating a system 200 for determining optical properties of an eye, in accordance with an embodiment of the present disclosure. There is shown a system 200 that comprises a processor 202. There is further shown a user device 204, an image capturing unit 206, a server 208, and a folder 210. Furthermore, there is shown a first subfolder 212, a second subfolder 214, and a database 216 of the user.

The system 200 comprises the processor 202. The term "processor" 202 as used herein refers to an application, program, process or device that responds to requests for information or services by another application, program, process or device (such as the external device) via a network interface. Optionally, the processor 202 may be on the user device 204. Optionally, the processor 202 may be external to the user device 204. Optionally, the processor 202 is on the server 208. Optionally, the processor 202 also encompasses software that makes the act of serving information or providing services possible. Optionally, it may be evident that the communication means of the external device may be compatible with a communication means of the processor 202, in order to facilitate communication there between. It will be appreciated that optionally the processor 202 includes, but is not limited to, a microprocessor, a micro-controller, a complex instruction set computing (CISC) microprocessor, a reduced instruction set computer (RISC) microprocessor, a very long instruction word (VLIW) microprocessor, or any other type of processing circuit. Optionally, the term "processor" 202 may refer to one or more than one individual processors, processing devices and various elements associated with the system 200. Optionally, the one or more than one individual processors, processing devices and elements are arranged in various architectures for responding to and processing the instructions that drive the system 200. The processor 202 is configured to collect one or more than one images of the eye. Moreover, the processor 202 is configured to analyze the collected one or more than one images using a trained neural network. Furthermore, the processor 202 is configured to determine the optical properties of the eye based on the analysis of the one or more than one images.

Optionally, the system 200 further comprises the user device 204. Optionally, the user device 204 has an image capturing unit 206 for obtaining the one or more than one images. Optionally, the system 200 further comprises a server 208 configured to store the collected one or more than one images in a folder 210 associated with a user. Optionally, the folder 210 has a first subfolder 212 specific for the one or more than one images of a left eye of the user, a second subfolder 214 specific for the one or more than one images of a right eye of the user, and a database 216 of the user.

The system 200 is used for determining the optical properties of the eye accurately and efficiently. It will be appreciated that the system 200 enables the users to self-examine the eye thereof using objective testing methods. Moreover, the system 200 could support the opticians and ophthalmologists who could monitor the properties of the eye of the user without requiring thereof to visit in person. Optionally, the system 200 further comprises a measurement tool (not shown) for measuring a distance between the image capturing unit 206 and the eye.

Various embodiments and variants disclosed above, with respect to the aforementioned system 200, apply mutatis mutandis to the computer program product of the system 200 for determining the optical properties of the eye.

The computer program product comprising a non-transitory computer-readable storage medium having computer-readable instructions stored thereon, the computer-readable instructions being executable by a computing device comprising a processor to execute the aforementioned method 100 as claimed in any of the aforementioned claims.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A computer-implemented method (100) for determining optical properties of an eye, the computer-implemented method comprising:

detecting a distance of an image capturing unit on a handheld mobile device relative to a position to the eye;

using a guidance algorithm, monitoring a first position of the eye in the image capturing unit's view;

using the guidance algorithm, monitoring a second position of the image capturing unit relative to a light source;

when the detected distance, the first position of the eye in the image capturing unit's view, and the second position relative to the light source, satisfy desired parameters, automatically collecting one or more than one images of the eye from the mobile device using the image capturing unit;

analyzing the collected one or more than one images using a trained neural network; and determining the optical properties of the eye based on the analysis of the one or more than one images.

2. The computer-implemented method (100) according to claim 1, wherein the one or more than one images are collected from a user device (204), or a server (208).

3. The computer-implemented method (100) according to claim 1, further comprising labelling and storing, in the server (208), the collected one or more than one images, wherein the collected one or more than one images are stored in a folder (210) associated with a user, wherein the folder has a first subfolder (212) specific for the one or more than one images of a left eye of the user, a second subfolder (214) specific for the one or more than one images of a right eye of the user, and a database (216) of the user.

4. The computer-implemented method (100) according to claim 1, further comprising pre-processing the collected one or more than one images for one or more than one of: a noise removal, a distortion correction, a red-eye effect detection, and a resolution correction.

5. The computer-implemented method (100) according to claim 1, further comprising activating an image capturing unit (206) of the user device, arranged relative to the eye, to obtain the one or more than one images when a red-eye effect is detected by the image capturing unit.

6. The computer-implemented method (100) according to claim 1, wherein analyzing the collected one or more than one images comprises one or more than one of: detecting patterns on the one or more than one images, determining a distance between the image capturing unit (206) and the eye, and determining shifts and tilts between the image capturing unit and eye axes, wherein the distance between the image capturing unit (206) and the eye is measured using a measurement tool.

7. The computer-implemented method (100) according to claim 1, wherein the trained neural network is a convolutional neural network.

8. The computer-implemented method (100) according to claim 1, further comprising employing artificial intelligence algorithms and machine learning tools for detecting the one or more than one characteristic features of the one or more than one images, wherein the machine learning tools are employed for sorting, systematizing, analyzing the one or more than one images and output a diagnosis based thereon, and the artificial algorithms employ the machine learning output and data derived from observation by a specialist to confirm the diagnosis.

9. The computer-implemented method (100) according to claim 1, further comprising screening users based on a pre-defined threshold.

10. The computer-implemented method (100) according to claim 1, further comprising providing a report of the analysis of the one or more than one images, wherein the report comprises one or more than one of: a defect, a probability of a measurement error, and an advice regarding a physical consultation with a specialist.

11. A system (200) for determining optical properties of an eye, the system comprising a handheld mobile device comprising a processor (202) configured to:

detect a distance of an image capturing unit on the handheld mobile device relative to a position to the eye;

monitor a first position of the eye in the image capturing unit's view;

monitor a second position of the image capturing unit relative to a light source;

when the detected distance, the first position of the eye in the image capturing unit's view, and the second position relative to the light source, satisfy desired parameters, automatically collect one or more than one images of the eye from the mobile device using the image capturing unit;

analyze the collected one or more than one images using a trained neural network; and determine the optical properties of the eye based on the analysis of the one or more than one images.

12. The system (200) according to claim 11, further comprising a user device (204) having an image capturing unit (206) for obtaining the one or more than one images; and a server (208) configured to store the collected one or more than one images in a folder (210) associated with a user, wherein the folder has a first subfolder (212) specific for the one or more than one images of a left eye of the user, a second subfolder (214) specific for the one or more than one images of a right eye of the user, and a database (216) of the user.

13. The system (200) according to claim 11, further comprising a measurement tool for measuring a distance between the image capturing unit (206) and the eye.

14. A computer program product comprising a non-transitory computer-readable storage medium having computer-readable instructions stored thereon, the computer-readable instructions being executable by a computing device comprising a processor (202) to execute instructions that cause the processor to:

detect a distance of an image capturing unit on a handheld mobile device relative to a position to the eye;

monitor a first position of the eye in the image capturing unit's view;

monitor a second position of the image capturing unit relative to a light source;

when the detected distance, the first position of the eye in the image capturing unit's view, and the second position relative to the light source, satisfy desired parameters, automatically collect one or more than one images of the eye from the mobile device using the image capturing unit;

analyze the collected one or more than one images using a trained neural network; and determine the optical properties of the eye based on the analysis of the one or more than one images.

\* \* \* \* \*